United States Patent
Rokitta et al.

[11] Patent Number: 5,911,554
[45] Date of Patent: Jun. 15, 1999

[54] BUNKER RAKING CARRIAGE WITH LOWERABLE RAKING WHEEL

[75] Inventors: Michael W. Rokitta, Köln; Markus Haarhaus, Tönisvorst; Heinrich Klaus, Köln; Michael Gramling, Königswinter, all of Germany

[73] Assignee: Louise Fördertechnik GmbH & Co., Köln, Germany

[21] Appl. No.: 08/683,379

[22] Filed: Jul. 18, 1996

[30] Foreign Application Priority Data

Jul. 18, 1995 [DE] Germany ............................. 195 25 943

[51] Int. Cl.⁶ .................................................. B65G 65/44
[52] U.S. Cl. ........................... 414/306; 414/325; 198/723
[58] Field of Search .................................. 414/305, 306, 414/307, 308, 324, 325, 327; 198/723

[56] References Cited

U.S. PATENT DOCUMENTS

| 3,401,787 | 9/1968 | Vaka .......................................... 198/723 |
| 3,889,826 | 6/1975 | Pate ........................................... 414/325 |
| 4,249,845 | 2/1981 | Teske .................................... 414/306 X |
| 4,311,426 | 1/1982 | Teske .................................... 414/306 X |

FOREIGN PATENT DOCUMENTS

| 568750 | 1/1933 | Germany . |
| 834227 | 3/1952 | Germany ................................. 414/306 |
| 1268548 | 5/1968 | Germany ................................. 414/306 |
| 2533931 | 2/1976 | Germany . |

*Primary Examiner*—James W. Keenan
*Attorney, Agent, or Firm*—Robert W. Becker & Associates

[57] ABSTRACT

A device for raking flowable material from a storage facility, with a plurality of storage units such as bunkers, silos, stockpiles, has a bunker table positioned at the bottom of the storage units and a rake tunnel positioned above the bunker table. A raking carriage is positioned in the rake tunnel above the bunker table so as to be moveable in a longitudinal direction of the rake tunnel along the bunker table. A drive unit, including a gear box and a drive shaft, is connected to the raking carriage. A raking wheel is rotatably connected perpendicular to a rotational plane of the raking wheel with the drive shaft to the raking carriage. The bunker table has a longitudinal slot. The raking wheel rakes with two opposite sides the flowable material on the bunker table through the slot of the bunker table onto a continuous conveyor system located under the bunker table. The raking wheel is displaceable with a shaft relative to the raking carriage and the slot of the bunker table has widened circular cutouts for allowing displacement of the raking wheel from a first position above the bunker table to a second position below the bunker table.

11 Claims, 4 Drawing Sheets

BUNKER RAKING CARRIAGE WITH LOWERABLE RAKING WHEEL

BACKGROUND OF THE INVENTION

The present invention relates to a device for emptying or raking flowable material from a flowable material storage facility comprised of a plurality of bunkers, silos, stock pules etc. With such flowable materials storage faciuties one problem exists in that the different flowabie materials for their mixing in different amounts must be removed from the individual bunkers, silos, stockpiles etc. This can, for example, be the case in coat-powered power plants when for maintaining the thermal power or exhaust gas specifications, coal types of different qualities must be mixed.

From U.S. Pat. No. 3,401,787 a raking device is known which comprises a raking tunnel positioned under the bunkers, silos, stockpiles etc. which includes a movable bunker raking carriage that is moved across a bunker table and comprises a raking wheel which is rotatably supported thereat. The raking wheel moves the flowable material on both sides from the bunker table via a slot provided in the bunker table onto a continuously operating conveyor device positioned below the raking tunnel. In this device, the bunker raking carriage, after completion of a raking assignment at one storage unit, must be moved from one location to another whereby, depending on the size of the storage device, the travel distance of the bunker raking carriage to the next location may be hundreds of meters long. Therefore, the bunker raking carriages complete this travel distance between the individual raking locations at a fast speed.

The necessary relocation of the bunker raking carriage requires that, during passing of bunkers, silos, stockpiles etc. that are not to be raked, the flowable material positioned on the bunker table in the areas not to be raked must not be engaged by the laterally protecting raking wheel because this would result in errors of the desired mixture of flowable materials.

As a solution to this problem U.S. Pat. No. 3,401,787 suggests that the raking arms of the raking wheel are connected thereto in a foldable manner so that during displacement of the bunker raking carriage the raking arms can be retracted from engagement with the flowable material present on the bunker table on either side of the raking wheel. However, this suggestion has the disadvantage that the folding mechanism for the foldable raking arms is prone to break down because of the rough environment in which the bunker raking carriage is operated and that, furthermore, it is hardly possible with respect to machine technological solutions to make the raking arms foldable into the contour of the bunker raking carriage in an economic (inexpensive) manner such that upon displacement of the bunker raking carriage no undesirable amount of flowable material is accidently removed.

In another raking device known from German Patent 568 750, it is thus suggested to use a raking wheel which rakes only at one side and which is displaceable via its drive shaft, coupled with a gear box to the drive motor, so that the raking wheel with a vertical upward movement can be brought into a position out of engagement with the flowable material flowing out of the lateral bunker slots. The bunker raking carriage can thus be moved to a new location with the raking wheel in a lifted position. However, this entails the disadvantage that the rake tunnel must cover the entire raking wheel to prevent flowable material from falling onto the raking wheel, respectively, a corresponding constructive height for displacement of the raking wheel into the lifted position above the bunker table must be provided. Furthermore, it is not ensured that by lifting the raking wheel into a position above the bunker table material will not be entrained.

It is therefore an object of the present invention to improve a device for raking flowable material from a flowable material storage facility such that with a simple and uncomplicated embodiment of the bunker raking carriage with raking wheel a movement of the bunker raking carriage to the required removal location is made possible without entraining flowable material.

SUMMARY OF THE INVENTION

The device for raking flowable material from a storage facility, the storage facility comprising a plurality of storage units selected from the group consisting of bunkers, silos, and stockpiles, according to the present invention is primarily characterized by:

A bunker table positioned at a bottom of the storage units;

A rake tunnel positioned above the bunker table;

A raking carriage positioned in the rake tunnel above the bunker table so as to be moveable in a longitudinal direction of the rake tunnel along the bunker table;

A drive unit, comprising a gear box and a drive shaft, connected to the raking carriage;

A raking wheel rotatably connected perpendicular to a rotational plane of the raking wheel with the drive shaft to the raking carriage;

The bunker table having a longitudinal slot;

The raking wheel raking with opposite sides the flowable material on the bunker table through the slot of the bunker table onto a continuous conveyor system located under the bunker table;

The raking wheel displaceable with the shaft relative to the raking carriage;

The slot of the bunker table having widened circular cutouts for allowing displacement of the raking wheel from a first position above the bunker table to a second position below the bunker table.

Advantageously, the gear box is fixedly connected to the raking carriage and the shaft is displaceable in a longitudinal direction of the drive shaft relative to the gear box, the drive shaft being positive-lockingly connected to the gear box.

Advantageously, the shaft has a shaft portion extending through the gear box, wherein the shaft portion has a polygonal contour, and the gear box has a through opening for receiving the shaft portion. The through opening has a contour matching the contour of the shaft portion.

In another embodiment of the present invention, the shaft has a shaft portion extending through the gear box, the shaft portion being a spline shaft. The gear box has a through opening for receiving the spline shaft, wherein the through opening has a contour matching the contour of the spline shaft.

Advantageously, the device further comprises a hydraulic cylinder connected to the shaft and supported at the raking carriage for displacing the shaft relative to the gear box.

In another embodiment of the present invention the device further comprises a sleeve covering the shaft and through opening of the gear box through which the shaft extends.

In yet another embodiment of the present invention the device further comprises at least one piston rod, connected between the shaft and the raking wheel, and a drive cylinder acting on the piston rod for displacing the raking wheel. It further comprises a torque-transmitting coupling acting between the shaft and the raking wheel when the raking wheel is in the first position.

Advantageously, the shaft is stationarily connected to the gear box and the coupling is comprised of an end of the shaft facing the raking wheel and a shaft segment connected to the raking wheel and facing the gear box. The end of the shaft and the shaft segment have meshing positive-locking elements.

Advantageously, the shaft and the piston rod have meshing polygonal profiles for connecting the shaft to the piston rod.

Preferably, the shaft has a hollow interior and the piston rod is positioned in the hollow interior of the shaft and rotates with the shaft. The drive cylinder is fixedly connected to the gear box and comprises a cylinder housing and a piston. The piston is connected to the piston rod so that the piston rotates relative to the cylinder housing.

Expediently, the shaft according to another embodiment has a hollow interior and the piston rod is positioned in the hollow interior of the shaft. The drive cylinder is connected to the rotating shaft. The drive cylinder comprises a connecting coupling for supplying a pressure medium to the rotating drive cylinder.

Preferably, the drive cylinder and the piston rod are connected laterally to the raking carriage adjacent to the shaft.

Preferably, two of the piston rods and two of the drive cylinders are provided at opposite sides of the raking carriage.

Expediently, the shaft is a telescoping shaft.

According to the present invention, a raking carriage is positioned in a rake tunnel arranged below bunkers, silos, stockpiles etc. The raking-carriage is displaceable along a bunker table. A raking wheel is rotatably connected to the raking carriage. It rakes the flowable material with opposite sides thereof through a slot provided at the bunker table onto a continuous conveyor system positioned below the rake tunnel. The bunker table is provided with widened circular cutouts at suitable spacings for allowing passage of the raking wheel connected perpendicular to its plane of rotation to the raking carriage with a shaft that can be coupled to a drive motor via a gear box.

The invention has the advantage that for the displacement of the bunker raking carriage the raking wheel is lowered from the raking plane into a plane below the bunker table so that, subsequently, the raking carriage can be quickly moved between individual raking locations without the risk of entraining undesirable amounts of flowable material. Once the bunker raking carriage has reached the next operating location, the raking wheel can be lifted from the plane below the bunker table into the raking plane through one of the circular widened portions of the slot within the bunker table so that the bunker raking carriage can resume the raking operation at the new location.

Since the rotational drive of the raking wheel supported with a drive shaft is stationarily arranged at the bunker raking carriage, according to a preferred embodiment of the invention the drive shaft supporting the raking wheel is longitudinally displaceable relative to the drive motor and the gear box stationarily connected to the bunker raking carriage. Between the shaft and the corresponding gear box a positive-locking connection is provided. In this manner it is ensured that the shaft supporting the raking wheel is longitudinally displaceably positioned within the gear box and that, on the other hand, due to the connection between the shaft and the gear box, the shaft can be rotated by the gear box without other additional measures for the raking operation.

According to other embodiments of the invention, the shaft may be provided with a polygonal profile (contour) or may be provided in the form of a spline shaft whereby the corresponding through opening in the gear box has a matching profile or contour. Alternatively, it is also possible to provide a form-locking (non-positive) clamping connection.

In order to ensure the displacement of the shaft, it is suggested in another embodiment of the invention that the shaft for its longitudinal displacement is connected to a hydraulic cylinder supported at the raking carriage.

In order to prevent soiling of the through opening for the shaft within the gear box, which would result in disruptions of the drive movement or the lifting movement for the raking wheel, according to another embodiment of the invention it is suggested to provide a sleeve covering the shaft as well as the through opening of the gear box.

In order to limit the necessary constructive height for the longitudinal displacement of the shaft according to the aforementioned embodiments of the invention, in an alternative embodiment it is suggested that the raking wheel is supported at at least one piston rod. For displacement of the raking wheel a drive cylinder is arranged at the piston rod whereby between the shaft and the raking wheel a torque-transmitting coupling is provided in the lifted position of the raking wheel. This has the advantage that the raking wheel is movable via a separately arranged drive device whereby the raking wheel with a shaft section arranged thereat is in engagement with a shaft end of the shaft so that a torque transmission from the rotating shaft onto the raking wheel is ensured. The torque-transmitting coupling according to one embodiment of the invention can be designed such that the end of the shaft facing the raking wheel is stationary at the gear box comprising the gear parts for rotating the shaft and that the shaft section connected to the raking wheel and facing the gear box are provided with meshing positive-locking elements for providing the torque-transmitting coupling. Alternatively, according to another embodiment of the invention, the shaft and piston rod may have a form-locking (non-positive) engagement area in the form of polygonal profiles engaging one another. In this embodiment it is advantageous that the cross-section of the shaft is of a round contour so that the transmission of torque within the gear box onto the round shaft is simplified.

With respect to the arrangement of the piston rod and the drive cylinder it is suggested in a first embodiment that the piston rod is positioned in the hollow interior of the shaft and that the drive cylinder is stationarily (fixedly) connected to the gear box so that the piston rod which rotates together with the shaft is rotatable relative to the drive cylinder. In the alternative, it may be provided that the piston rod is positioned in the interior of the shaft and the drive cylinder is connected with the rotating shaft whereby a connecting coupling for bridging the cylinder rotation is provided to supply the drive cylinder with pressure medium. It may also be expedient to position the piston rod and the drive cylinder external to the axis of the shaft at the bunker raking carriage whereby for accomplishing load symmetry according to a further embodiment of the invention a piston rod with drive cylinder should be arranged on both sides of the bunker raking carriage.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
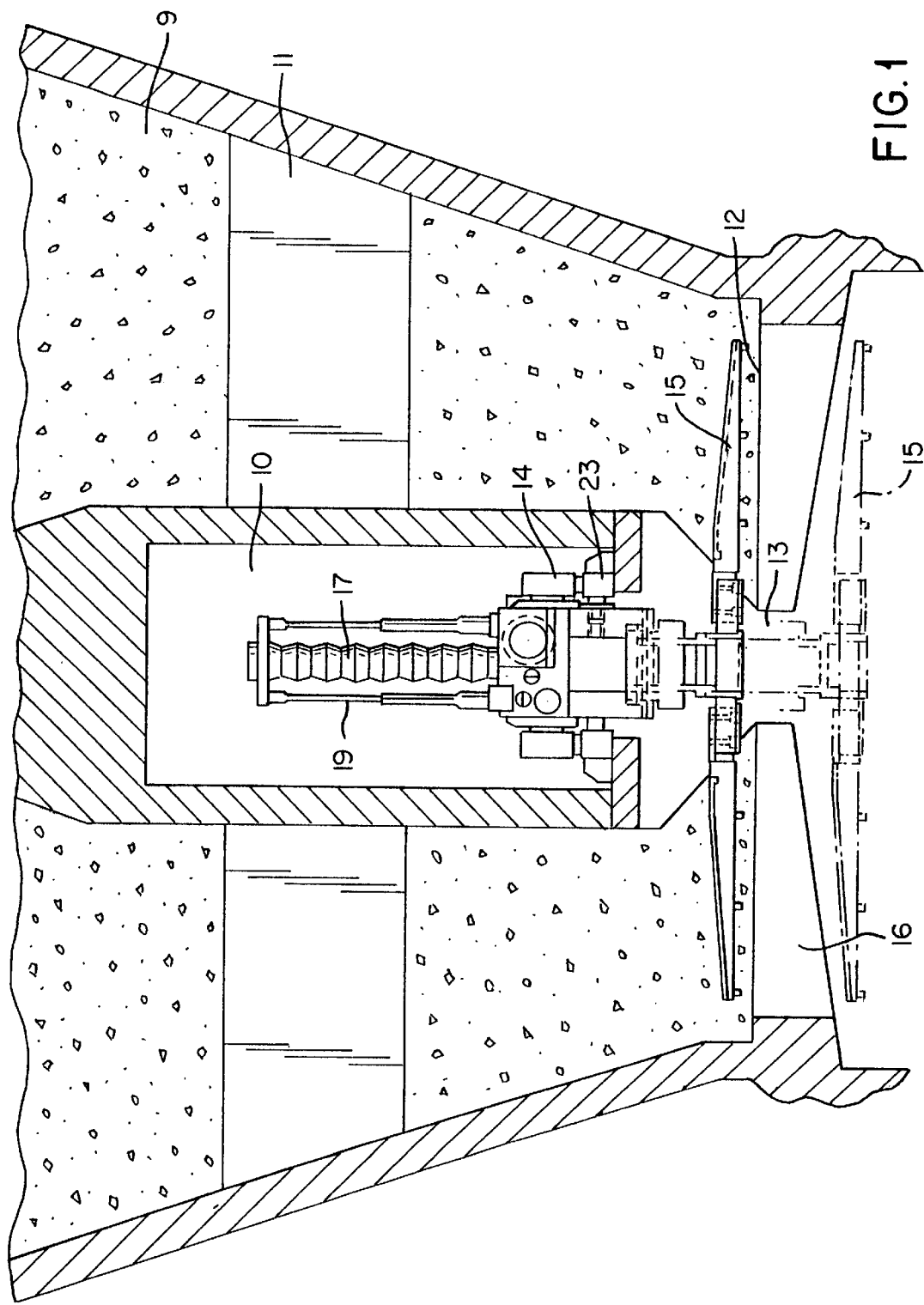
FIG. 1 shows in section a rake tunnel with bunker raking carriage arranged below a bunker.

The present invention will now be described in detail with the aid of several specific embodiments utilizing FIGS. 1 through 3.

In a rake tunnel 10 which is supported by supports 11 laterally connected to the bunker walls 9, a bunker raking carriage 14 is displacably arranged or rails 23 within the rake tunnel. The bunker rake carriage 14 supports with a shaft 17 a raking wheel 15 which is rotatable in a plane above a corresponding bunker table 12. At the center of the bunker table 12 a longitudinally extending slot 13 is provided below which a non-represented continuous conveyor system is arranged so that the flowable material on the bunker table 12 entrained by the raking arms of the raking wheel 15 is conveyed into the slot 13 and, via the slot 13, falls onto the non-represented continuous conveyor system.

As can be seen in FIG. 1, the shaft 17 is displaceable along an axis which is perpendicular to the rotational plane of the raking wheel 15 so that the raking wheel 15 can be displaced from a position above the bunker table 12 into a position below the bunker table 12. For this purpose, the bunker table 12 is provided with circular cutouts 16 of the slot 13 provided in a suitable distance relative to one another which have a diameter such that the raking wheel 15 is movable without obstruction through the cutouts 16.

Figure 2:
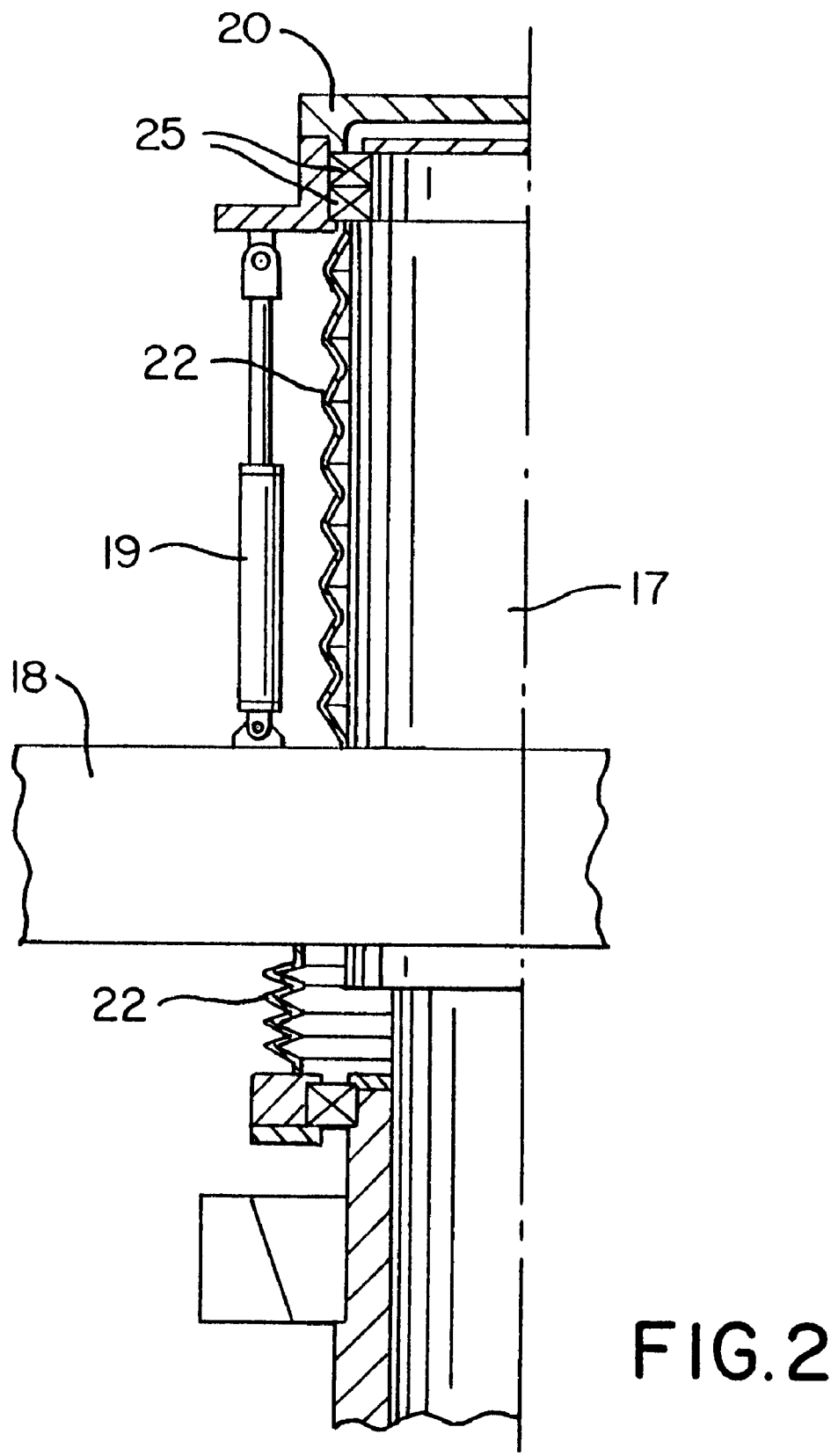
FIG. 2 shows in a detailed representation the arrangement of a longitudinally displaceable shaft of a raking wheel.

One proposal for the embodiment of the bunker raking carriage 14 with longitudinally displaceable shaft 17 is represented in an exemplary manner in FIG. 2. Gear unit 18 of the bunker raking carriage 14 is penetrated by the shaft 17 and the shaft 17 is longitudinally displaceably arranged within the gear unit (gear box 18).

A hydraulic cylinder 19 engages a shaft head 20 connected via roller bearings 25 to the shaft 17 which hydraulic cylinder 19 is supported at the gear box 18 and which provides for the longitudinal displacement of the shaft 17.

In order to prevent soiling of the shaft and especially of the coupling area between the shaft 17 and the gear box 18, a sleeve 22 covering the displacement area of the shaft 17 is provided which with one end is connected to the gear box 18 and with the other end is connected to the shaft 17 so that the shaft is reliably protected against soiling.

Figure 3:
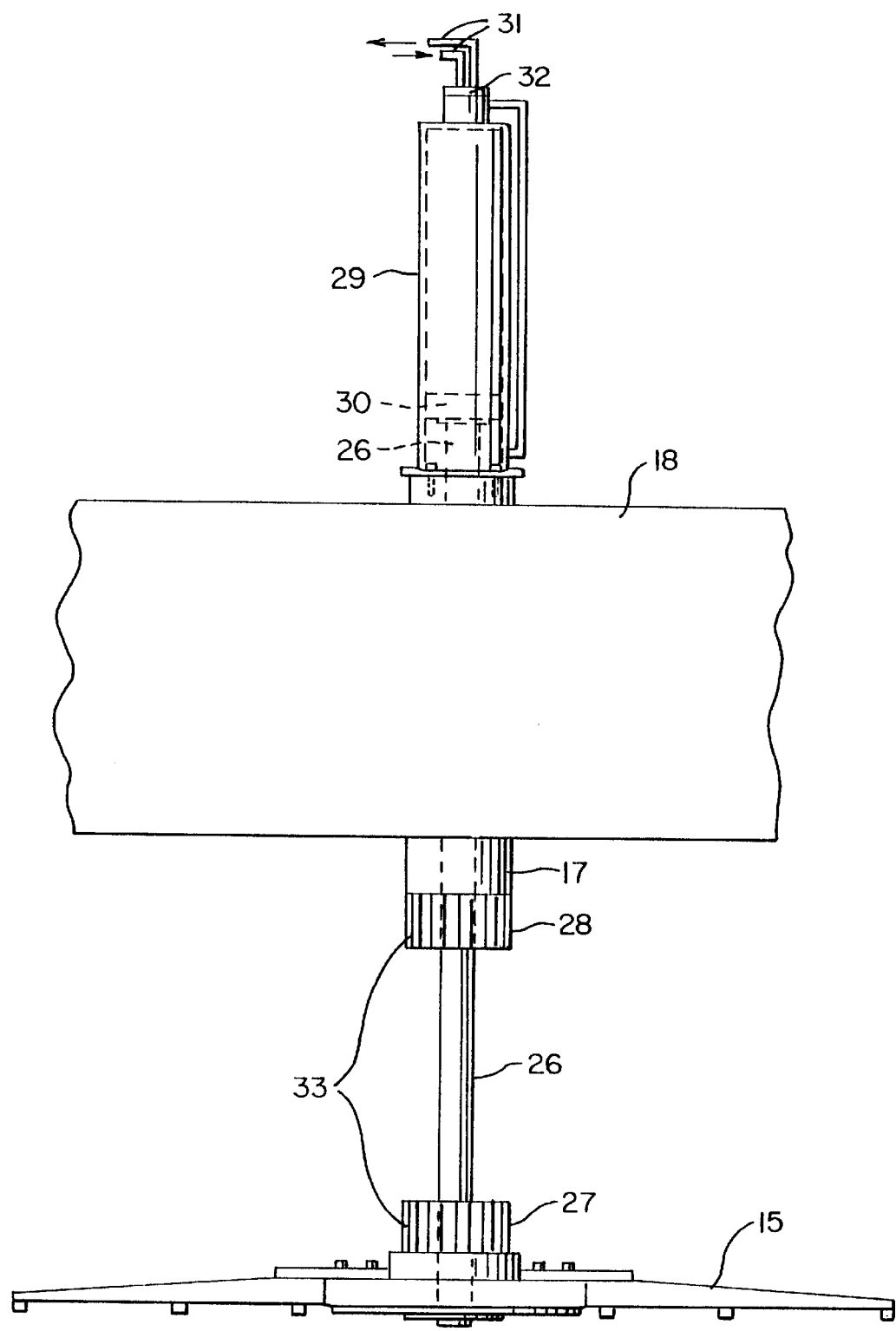
FIG. 3 shows in a detailed representation the arrangement of a lowerable raking wheel with drive unit.

FIG. 3 shows one embodiment of the invention in which the raking wheel 15 is supported by a piston rod 26 which extends through the interior of the shaft 17 into a drive cylinder 29 at the gear box 18 which guides the shaft 17. The axis of the piston rod 26 coincides with the axis of the shaft 17. For transmitting torque from the shaft 17 onto the raking wheel 15 in the lifted position of the raking wheel, the raking wheel 15 comprises a shaft section 27 facing the gear box 18 whereby the shaft section 27 and the end 28 of the shaft 17 may be provided with form-lockingily engaging spline shaft toothings in order to provide the torque-transmitting coupling 33.

For displacing the raking wheel 15 with the aid of the piston rod 26, the piston rod comprises at its free end a piston 30 which is guided within the cylinder housing of the drive cylinder 29. Via corresponding hydraulic lines 31 a suitable pressure medium, preferably a hydraulic liquid, is transmitted in the desired orientation onto the drive cylinder 29 so that the piston 30 with piston rod 26 is displaced into the lifted position of the raking wheel 15 at the shaft 17 or into the lowered position, as shown in FIG. 3.

In the represented embodiment the drive cylinder 29 is fixedly connected to the shaft 17 so that the drive cylinder 29 upon rotation of the shaft 17 also rotates. Since the raking wheel 15 is form-lockingly connected to the shaft 17, the piston rod 26 also rotates with the piston 30 in the same direction so that no relative movement of the parts 26, 29, 30 takes place. Since the lines 31 are stationary, a connecting coupling 32 is provided with which the stationary end of the lines 31 can be connected to the head of the rotating drive cylinder 29.

Figure 4:
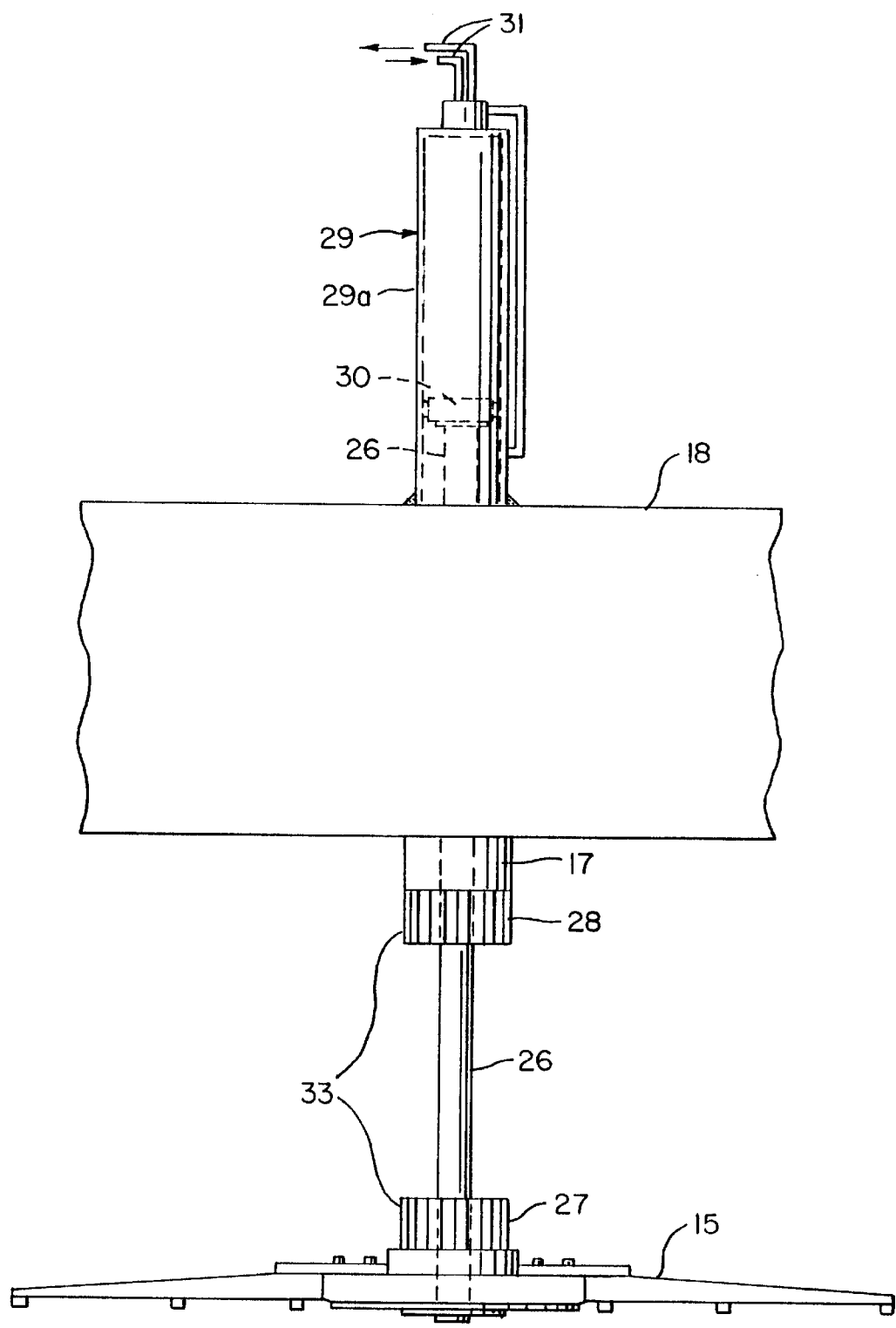
FIG. 4 shows an alternative to the embodiment of FIG. 3 in which the drive cylinder is attached to the gear box.

In an alternative embodiment shown in FIG. 4, the drive cylinder 29 can be fixedly connected to the gear box 18 whereby upon rotation of the raking wheel 15 the piston 30 is rotated within the stationary cylinder housing 29a of the drive cylinder 29. In this case, the coupling 32 is obsolete. However, a sealing means between the piston 30 and the drive cylinder 29 must be provided in order to take into consideration the relative movement of the piston 30 relative to the cylinder housing 29a of the drive cylinder 29. In another embodiment, also not represented in the drawings, comparable drive cylinders with piston rods can be positioned laterally at the bunker raking carriage 14, as can be envisioned based on the representation of the embodiment of FIG. 3 transferred onto the basic representation of FIG. 1.

The present invention is, of course, in no way restricted to the specific disclosure of the specification and drawings, but also encompasses any modifications within the scope of the appended claims.

What we claim is:

1. A device for raking flowable material from a storage facility, said storage facility comprising a plurality of storage units selected from the group consisting of bunkers, silos, stockpiles, said device comprising:

a bunker table positioned at a bottom of said storage units;

a rake tunnel positioned above said bunker table;

a raking carriage positioned in said rake tunnel above said bunker table so as to be displaceable in a longitudinal direction of said rake tunnel along said bunker table;

a drive unit, comprising a gear box and a drive shaft, connected to said raking carriage;

a raking wheel rotatably connected perpendicular to a rotational plane of said raking wheel with said drive shaft to said raking carriage;

said bunker table having a longitudinal slot;

said raking wheel raking with opposite sides the flowable material on said bunker table through said slot of said bunker table onto a continuous conveyor system located under said bunker table;

said raking wheel displaceable with said shaft relative to said raking carriage;

said slot of said bunker table having widened circular cutouts for allowing displacement of said raking wheel from a first position above said bunker table to a second position below said bunker table.

2. A device according to claim 1, wherein said gear box is fixedly connected to said raking carriage and wherein said shaft is displaceable in a longitudinal direction of said drive shaft relative to said gear box, wherein said drive shaft is positive-lockingly connected to said gear box.

3. A device according to claim 2, wherein said shaft has a shaft portion extending through said gear box, wherein said shaft portion has a contour, and wherein said gear box has a through opening for receiving said shaft portion, said through opening having a contour matching said contour of said shaft portion.

4. A device according to claim 2, wherein said shaft has a shaft portion extending through said gear box, wherein said shaft portion is a spline shaft, and wherein said gear box has a through opening for receiving said spline shaft, said through opening having a contour matching said contour of said spline shaft.

5. A device according to claim 2, further comprising a hydraulic cylinder connected to said shaft and supported at said raking carriage for displacing said shaft relative to said gear box.

6. A device according to claim 2, further comprising a sleeve covering said shaft and a through opening of said gear box through which said shaft extends.

7. A device according to claim 1, further comprising at least one piston rod, connected between said shaft and said raking wheel, and a drive cylinder acting on said piston rod for displacing said raking wheel, further comprising a torque-transmitting coupling acting between said shaft and said raking wheel when said raking wheel is in said first position.

8. A device according to claim 7, wherein said shaft is stationarily connected to said gear box and wherein said coupling is comprised of an end of said shaft facing said raking wheel and a shaft segment connected to said raking wheel and facing said gear box, wherein said end of said shaft and said shaft segment have meshing positive-locking elements.

9. A device according to claim 7, wherein said shaft and said piston rod have meshing profiles for connecting said shaft to said piston rod.

10. A device according to claim 7, wherein:

said shaft has a hollow interior;

said piston rod is positioned in said hollow interior of said shaft and rotates with said shaft;

said drive cylinder is fixedly connected to said gear box and comprises a cylinder housing and a piston;

said piston connected to said piston rod so that said piston rotates relative to said cylinder housing.

11. A device according to claim 7, wherein:

said shaft has a hollow interior;

said piston rod is positioned in said hollow interior of said shaft;

said drive cylinder is connected to said rotating shaft;

said drive cylinder comprises a connecting coupling for supplying a pressure medium to said rotating drive cylinder.

* * * * *